United States Patent [19]

Sawyer, III

[11] Patent Number: 5,131,570
[45] Date of Patent: Jul. 21, 1992

[54] SEED DISPENSING DEVICE FOR REPAIRING DIVOTS

[76] Inventor: Kenneth C. Sawyer, III, 245 Dahlia, Denver, Colo. 80220

[21] Appl. No.: 696,331

[22] Filed: May 1, 1991

Related U.S. Application Data

[63] Continuation of Ser. No. 380,282, Jul. 17, 1989, abandoned.

[51] Int. Cl.$^5$ .................. B67D 5/64; A01C 5/02; B65D 5/72
[52] U.S. Cl. .................. 222/175; 222/613; 222/501; 222/518; 222/559; 111/92
[58] Field of Search ........... 222/501, 322, 518, 559, 222/613, 174, 175, 471; 111/7.2, 92, 95, 96; 401/264, 272, 273; 221/185, 186

[56] References Cited

U.S. PATENT DOCUMENTS

| | | | |
|---|---|---|---|
| 431,841 | 7/1890 | Davis . | |
| 558,448 | 4/1896 | Brown | 111/95 X |
| 577,795 | 2/1897 | Taylor et al. . | |
| 697,700 | 4/1902 | Alden | 222/501 X |
| 1,006,075 | 10/1911 | Foster | 222/501 |
| 1,115,062 | 10/1914 | Fuller | 222/501 X |
| 1,431,467 | 10/1922 | Kooperstein | 222/501 X |
| 2,028,655 | 1/1936 | Fitzkee | 222/501 X |
| 2,051,672 | 8/1936 | Baker | 222/501 X |
| 2,182,870 | 12/1939 | Pipenhagen | 222/501 X |
| 2,192,479 | 3/1940 | Nissen, Jr. | 222/501 X |
| 2,370,744 | 3/1945 | Molinare | 111/96 |
| 2,489,162 | 11/1949 | Schulman | 222/501 |
| 2,508,939 | 5/1950 | De Swart | 222/501 X |
| 2,600,131 | 6/1952 | Schwarm et al. | 111/1 |
| 2,656,071 | 10/1953 | Smith | 222/133 |
| 2,737,318 | 3/1956 | Molinare | 222/191 |
| 2,772,815 | 12/1956 | Bye | 222/471 X |
| 2,885,121 | 5/1959 | Littleton | 111/7.2 X |
| 2,898,016 | 8/1959 | Franck et al. | 222/501 |
| 3,745,945 | 7/1973 | Wilson | 222/162 X |
| 3,749,034 | 7/1973 | Bergius et al. | 111/4 |
| 3,847,312 | 11/1974 | Marr et al. | 222/501 |
| 4,206,714 | 6/1980 | Walsh | 111/92 |
| 4,218,981 | 8/1980 | Kelly | 111/89 |
| 4,286,737 | 9/1981 | Gallant | 222/470 |
| 4,290,374 | 9/1981 | Maples | 111/92 |
| 4,372,467 | 2/1983 | Pritchitt | 222/501 |
| 4,614,160 | 9/1986 | Curlett | 111/96 |
| 4,694,760 | 9/1987 | Camp | 111/92 |
| 4,760,807 | 8/1988 | Keller | 111/92 |
| 4,896,797 | 1/1990 | Tumlin | 222/175 |
| 4,921,144 | 5/1990 | Vardar | 222/501 X |

Primary Examiner—Kevin P. Shaver
Assistant Examiner—Kenneth DeRosa
Attorney, Agent, or Firm—John E. Reilly

[57] ABSTRACT

An apparatus has been devised for repairing divots on a golf course which is comprised of an elongated tubular housing containing seeds or dressing and has a lower dispenser end, a spring-loaded rod disposed in the lower end including an agitator at the upper end of the rod and a valve member which releasably engages a valve seat in the lower end of the housing. When the rod is depressed against the ground, the valve is raised away from the seat and an agitator associated with the rod will loosen seeds or dressing to facilitate its discharge by gravity feed through the lower end of the housing so that it can be deposited evenly onto the area to be repaired.

10 Claims, 1 Drawing Sheet

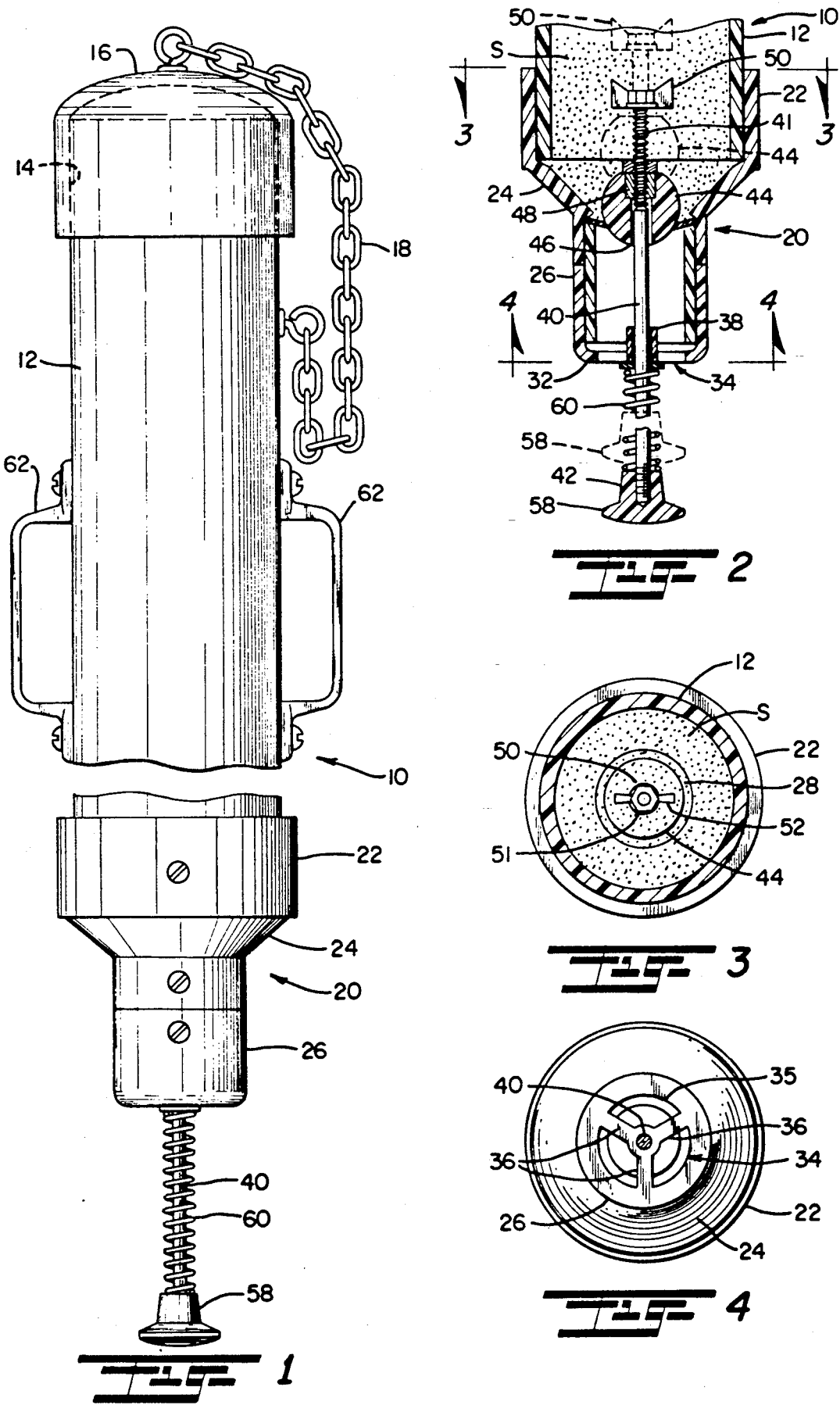

SEED DISPENSING DEVICE FOR REPAIRING DIVOTS

This application is a continuation application of Ser. No. 380,282, filed 17 Jul., 1989 now abandoned, for SEED DISPENSING DEVICE FOR REPAIRING DIVOTS, invented by K. C. Sawyer, III.

This invention relates to portable dispensers; and more particularly relates to a novel and improved device for dispensing a mixture of grass seed and dirt or fertilizer and which is specifically adaptable for use in repairing divots on a golf course.

BACKGROUND AND FIELD OF THE INVENTION

Good golf course maintenance customarily requires an effective means for repairing divots caused when a portion of the turf is taken in hitting the ball. In certain types of grasses, the divot can be replaced and will grow back in a relatively short period of time. However, other types of grasses, for example, certain bent and bermuda grasses that are used in the southern part of the United States do not tend to grow back and it is therefore recommended that the golfer not attempt to replace the divot. Instead, the golf carts are equipped with a bucket or open container filled with a seed and dirt mixture, or a dressing, and a scoop is employed to permit the golfer to spread the seed and dirt mixture over the bare spot which is left when the divot is taken. Such a method for repairing divots is time-consuming and tends to slow down play and is not always efficient in use. Moreover, if the mixture should become damp or wet as a result of inclement weather conditions, it is very difficult to spread.

Accordingly, there is a definite need for a dispenser tool which can be conveniently stored on a golf cart and rapidly but effectively used to repair divots while avoiding the aforementioned problems. Seed dispenser units have been devised in the past for reseeding bare spots in a lawn and, for example, reference is made R. F. Walsh U.S. Pat. No. 4,206,714 in which telescoping tubular members include an inner member which actuates a ball-shaped valve confined within a cage to release seed from an upper chamber area formed by the outer tubular member above the valve. The telescoping tubular members are compressed together, for example, by pressing the lower tubular member against the ground surface so as to open the valve and permit a measured amount of seed to be deposited.

In A. W. Molinare U.S. Pat. No. 2,737,318 a tubular dispenser is provided for releasing fertilizer from the handle portion of a shovel by means of an inner rod working in cooperation with a pair of valve members to cause a powder-like fertilizer material to be released through a lateral opening above the earth-working implement or shovel at the lower end of the tool. Other representative patents in this field are those U.S. Pat. Nos. 2,600,131 to O. Schwarm et al; 431,841 to J. D. Davis; 4,694,760 to J. A. Camp and 3,749,034 to M. H. Bergius et al.

Repairing a divot taken on the golf course presents somewhat different considerations from those involved in reseeding bare spots on a lawn in that a portion of the turf is removed along with the grass and most golfers are not prone to spend the necessary time or effort in repairing the divot. Accordingly, it is important that the seed be dispensed along with a dirt or dressing mixture which will replace the turf that has been lost and at the same time provide an effective carrier for the seed which will permit it to take hold and grow. However, a particular problem presented in dispensing a combination of seed and dirt or other dressing material is its tendency to become compacted within the confines of a tubular housing. It is therefore proposed to overcome the foregoing problems peculiar to repair of divots by employing a tool which can be conveniently used either by a golfer or maintenance crew to more rapidly and effectively repair divots and which also serves as an effective means for repairing patches or bare spots in any lawn area.

SUMMARY OF THE INVENTION

Accordingly, it is an object of the present invention to provide for a novel and improved dispenser for seed and dirt mixtures which is specifically adaptable for use in repairing divots on a golf course.

It is another object of the present invention to provide for a divot repair apparatus for golf course maintenance which is compact and rugged so as to be easily stowable on a golf cart and can be readily removed by the golfer for repairing divots in one simple operation and returned to its stored position on the golf cart.

A further object of the present invention to provide for a novel and improved dispenser for seed/dirt mixtures or dressings which is so constructed and arranged as to agitate the mixture to facilitate its release from a discharge opening when the device is operated.

In accordance with the present invention, a preferred form of dispenser apparatus for repairing divots on a golf course comprises an elongated tubular housing containing seeds, dressing or a seed/dirt mixture, the housing including an upper end and a lower discharge end having a valve seat therein, a valve control assembly including an elongated slender rod, and a valve member disposed on the rod within the housing. The rod is mounted in the lower end of the housing for movement axially through the lower end including means normally urging the rod in a direction causing the valve member to engage the valve seat, and an agitator is associated with the rod above the valve member and movable with the rod to loosen the seed or dressing so that it is free to fall by gravity through the lower discharge end of the housing when the valve is moved to an open position.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 1 is a front view in elevation of a preferred form of divot repair dispenser in accordance with the present invention;

FIG. 2 is a fragmentary sectional view of the lower end of the preferred form of dispenser shown in FIG. 1;

FIG. 3 is a cross-sectional view taken about lines 3—3 of FIG. 2; and

FIG. 4 is a cross-sectional view taken about lines 4—4 of FIG. 2.

DETAILED DESCRIPTION OF PREFERRED EMBODIMENT

Referring in detail to the drawings, there is illustrated in FIGS. 1 to 4 a preferred form of dispenser apparatus 10 for repairing divots taken on a golf course with a seed and dirt mixture generally designated at S. The mixture is contained within an elongated tubular housing member 12 having an upper open end 14 which is normally closed by a releasable closure cap 16. The cap is preferably mounted in pressfit engagement over the upper end 14 and is secured by means of a chain 18 to the external sidewall of the housing so as to prevent its accidental loss when removed for the purpose of filling the container or housing 12 with the mixture S. The lower end of the housing 12 has an adaptor 20 having an upper enlarged end 22 permanently attached to the lower end of the housing proper and converging downwardly through an inclined wall portion 24 into a smaller tubular end portion 26 which is of limited length with respect to the overall length of the housing 12. Positioned within the reduced end portion 26 is an annular concave valve seat 28 which is supported on an inner wall portion 30 affixed to the inner wall surface of the reduced end 26, the valve seat forming a part of the valve control assembly to be described. In addition, the lower extremity 32 of the reduced end 26 is curved inwardly to form a retainer ledge for an open support bracket 34. As best seen from FIGS. 2 and 4, the support bracket 34 includes an annular support member 35 and radially extending arms 36 which terminate in a central guide bushing 38. The bushing 38 serves to center and guide the reciprocal motion of the moving parts of the valve control assembly in a manner to be hereinafter described.

An important feature of the present invention resides in the construction and arrangement of the valve control assembly which comprises an elongated rod 40 having externally threaded portions 41 and 42 at opposed upper and lower ends, respectively. A generally spherical or ball-shaped valve member 44 is provided with a central bore 46 including a nut 48 in the upper end of the bore which threadedly engages the upper threaded portion 41. An agitator member 50 is threaded onto the upper end 41 in upper spaced relation to the valve 44. As shown in FIGS. 2 and 3, the agitator 50 includes a central hub 51 and radially extending, propeller-shaped arms 52 extending away from the hub. The agitator is affixed to the rod by suitable means, such as, lock nuts and washers. The lower end of the rod 40 extends downwardly through the guide bushing 38 and has an enlarged generally knob-shaped end portion 58 threaded onto the lower end 42 of the rod 40. The rod is biased or normally urged in a downward direction causing the valve 44 to move into engagement with the valve seat 28 by a coiled spring member 60 which is mounted under compression between the lower end surface of the bushing 38 and the upper edge of the end portion 58. In this relation, the valve 44 is sized to be of a diameter slightly greater than the opening size of the valve seat 28 so that it will rest against the valve seat when the rod is urged downwardly by the spring member thereby closing the lower end of the housing to prevent accidental removal of the mixture S.

In the preferred form, the housing 12 may be dimensioned according to its particular use or application. For example, it can be made somewhat larger for use by professional maintenance crews so as to have a larger storage capacity and of somewhat more heavy duty construction, such as, in the wall thickness of the housing to withstand repeated use and jarring without breaking. On the other hand, those intended for use by individual golfers and to be mounted on golf carts can be of a more lightweight, compact construction. In either case, it is desirable that the overall length of the tool be on the order of 42" so that the tool can be operated from an upright position. In order to further facilitate handling of the tool, handles 62 may be conveniently attached to diametrically opposed surfaces of the housing 12 adjacent to its upper end.

Typically, when intended for use by the golfer, the device can be stored in an upright position in or adjacent to the golf bag storage area on the golf cart. When the tool is to be used, it is necessary merely to grasp it by the handles or on the external surface of the housing and place it in position with the lower knob-like end 58 in contact with the area to be repaired. By pressing the housing 12 down with respect to the lower ground-engaging end 58, the rod 40 will be caused to move upwardly with respect to the reduced end 26 of the housing, causing the valve member 44 to be lifted away from the valve seat 28 and permit the mixture S to pass by gravity downwardly through the reduced end of the housing. By oscillating the housing through a series of up and down motions, the desired amount of mixture can be dispensed. The agitator 50 will cooperate with the ball valve 44 in loosening the mixture S in the area surrounding the valve as well as above the valve and avoid any tendency on the part of the mixture to be compacted or lodged against the reduced end of the housing.

The desired amount of mixture S can be introduced into the housing by removing the cap 16 and pouring the mixture into the upper end of the housing 12. Although the mixture has been described as being a combination of seed and dirt, it will be evident that the dispensing device can be used for dispensing seed only as well as other dressing materials in place of dirt alone or in combination with the seed.

It is therefore to be understood that the foregoing and other modifications and changes may be made in the construction and arrangement of parts comprising the preferred form of invention as well as its intended use and application without departing from the spirit and scope of invention as defined by the appended claims and reasonable equivalents thereof.

I claim:

1. Portable dispenser apparatus manually activated by an individual operator for repairing divots on a golf course by dispensing seeds or dressing or mixture thereof onto a ground surface comprising:

an elongated tubular housing containing the seeds or dressing, said housing including upper inlet means at an upper end thereof for filling said housing with the seeds or dressing and a lower discharge end having a valve seat therein, said housing extending upwardly from the ground surface above the waist level of the operator when placed on the ground surface whereby said upper inlet means can be grasped in the hand or hands and manually reciprocated in an up and down direction;

a valve control assembly including an elongated slender rod, a valve member disposed on said rod within said housing, means mounting said rod in said lower discharge end of said housing for reciprocal movement axially through said valve seat, a lower terminal end of said rod extending downwardly beyond said housing, and bias means on said lower terminal end of said rod externally of said housing for normally urging said rod in a direction causing said valve member to engage said valve seat; and agitator means associated with said rod above said valve member and movable with said rod to loosen said seeds or dressing for downward gravity flow through said valve seat and said lower discharge end when said upper inlet means is grasped by the operator in a standing position and manually activated in an up and down motion to reciprocate said valve member against the ground surface thereby dispensing said seeds or dressing through said valve seat onto the ground surface.

2. Apparatus according to claim 1, said valve member affixed to said rod, and valve support means disposed between said valve member and said rod for adustably positioning said valve member on said rod whereby to regulate the distance of downward extension of said lower terminal end of said rod beyond said housing.

3. Apparatus according to claim 1 said rod having a lower enlarged end portion engageable with the ground surface, and said mounting means including a lower tubular extension and centering arms beneath said valve seat for guiding said rod centrally of said valve seat.

4. Apparatus according to claim 1, said agitator means including propeller-shaped radial arm members mounted on said rod in vertically spaced relation to said valve member.

5. Apparatus according to claim 1, said rod member having an enlarged lower end, said bias means being in the form of a coil spring member interposed between the enlarged end of said rod and said mounting means disposed externally of said housing to yieldingly resist movement of said rod in an upward direction through said lower end of said housing.

6. Apparatus according to claim 1, said upper end of said housing having a releasable closure therein, and external handle means on said housing manually engageable to impart reciprocal motion to said rod when said lower terminal end is placed against the ground surface.

7. A portable dispenser tool which can be hand-carried by an individual operator for repairing divots in a ground surface of a golf course from an upright position of the operator by the application of a seed and dirt mixture to the ground surface comprising:

an elongated tubular housing containing said seed and dirt mixture, said housing including mixture inlet means for fillings aid housing with said seed and dirt mixture and a lower mixture discharge end of reduced size having a centrally disposed valve seat therein, said housing extending above the waist level of said operator;

a valve control assembly including an elongated slender rod, a ball-shaped valve member disposed on said rod within said housing including means for adjustably positioning said valve member on said rod, means mounting said rod in said lower discharge end of said housing for reciprocal movement through said valve seat including bias means on said lower terminal end of said rod externally of said housing for normally urging said rod in a direction causing said valve member to engage said valve seat, said rod having a lower enlarged end portion engageable with the ground surface, and said mounting means including centering means guiding said rod centrally of the lower end of said housing, and agitator means mounted on said rod above said valve member for loosening said seed/dirt mixture when the operator in a standing position grasps said upper inlet means and manually activates said housing in an up and down motion to cause reciprocal movement of said rod against the ground surface.

8. Apparatus according to claim 7, said rod member having an enlarged lower end, said bias means being in the form of a coil spring member interposed between the enlarged end of said rod and said mounting means to yieldingly resist movement of said rod in an upward direction through said lower end of said housing.

9. Apparatus according to claim 9, in which said valve seat is spaced above the lower discharge end of said housing and said means for adjustably positioning said valve member on said rod is defined by threaded adjusting means between said rod and said valve member to vary the distance of downward extension of said lower terminal end of said rod beyond said housing.

10. Apparatus according to claim 7, said agitator means including radially extending propeller-shaped arm members mounted on the upper end of said rod above said valve member.

* * * * *